United States Patent
Larkins

(10) Patent No.: US 11,975,690 B2
(45) Date of Patent: May 7, 2024

(54) SWING AWAY TAILGATE BARBEQUE COOKING SYSTEM

(71) Applicant: William Douglas Larkins, Burns, TN (US)

(72) Inventor: William Douglas Larkins, Burns, TN (US)

(*) Notice: Subject to any disclaimer, the term of this patent is extended or adjusted under 35 U.S.C. 154(b) by 80 days.

(21) Appl. No.: 17/650,850

(22) Filed: Feb. 12, 2022

(65) Prior Publication Data
US 2022/0266760 A1    Aug. 25, 2022

Related U.S. Application Data

(60) Provisional application No. 63/207,249, filed on Feb. 19, 2021.

(51) Int. Cl.
*B60R 9/06* (2006.01)
*A47J 37/07* (2006.01)

(52) U.S. Cl.
CPC ............. *B60R 9/06* (2013.01); *A47J 37/0704* (2013.01)

(58) Field of Classification Search
CPC ...... B60R 9/06; B60R 2011/004; B60R 11/00
USPC .................................. 414/462–466
See application file for complete search history.

(56) References Cited

U.S. PATENT DOCUMENTS

| | | | | |
|---|---|---|---|---|
| 7,591,404 B2* | 9/2009 | LeDuc | ...................... | B60R 9/06 126/276 |
| 7,631,791 B1* | 12/2009 | Allen | ......................... | B60R 9/10 224/531 |
| 2003/0090083 A1* | 5/2003 | Williams | ............... | B60D 1/173 280/460.1 |
| 2005/0083678 A1* | 4/2005 | Keller | ................. | A47J 37/0704 362/253 |
| 2006/0086353 A1* | 4/2006 | Ransford | .................. | B60R 9/06 126/41 R |
| 2006/0201980 A1* | 9/2006 | Koons | .................... | B60D 1/075 254/323 |
| 2008/0098902 A1* | 5/2008 | Mansfield | ........... | A47J 37/0786 99/341 |
| 2012/0187658 A1* | 7/2012 | Wheeler | ................ | B60D 1/665 280/415.1 |
| 2012/0292357 A1* | 11/2012 | Tennyson | .................. | B60R 9/06 224/521 |
| 2019/0053667 A1* | 2/2019 | Jensen | ................ | A47J 37/0786 |
| 2021/0101428 A1* | 4/2021 | Bowles | ..................... | B60R 9/10 |

* cited by examiner

Primary Examiner — Lynn E Schwenning

(57) ABSTRACT

The swing away tailgate barbeque cooking system allows for a cooking apparatus to be mounted on a vehicle or RV. The unit can swing away from the vehicle on a plane up to approximately 180 degrees. The cooking apparatus can be pivoted into a position that is favorable for cooking. Adjustable leg(s) can be utilized which enable the unit to be much heavier than other swing away units. The adjustable legs also allow the unit to be in a level orientation when on uneven ground. The unit can be disconnected and rolled away from the carry vehicle. The swing away tailgate barbeque cooking system has the dual functionality to be an everyday home cooking device and a mobile cooking unit for camping or tailgating.

20 Claims, 12 Drawing Sheets

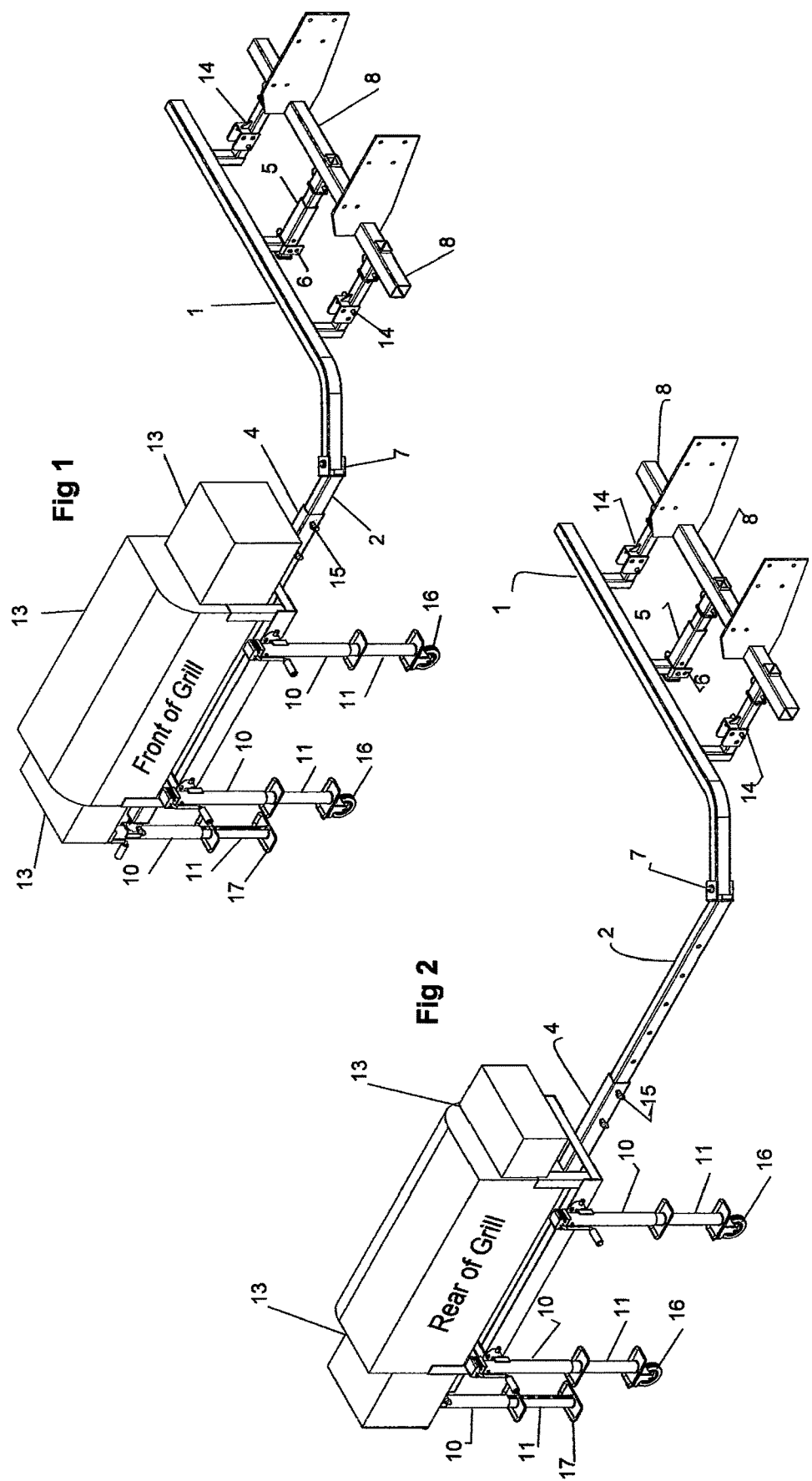

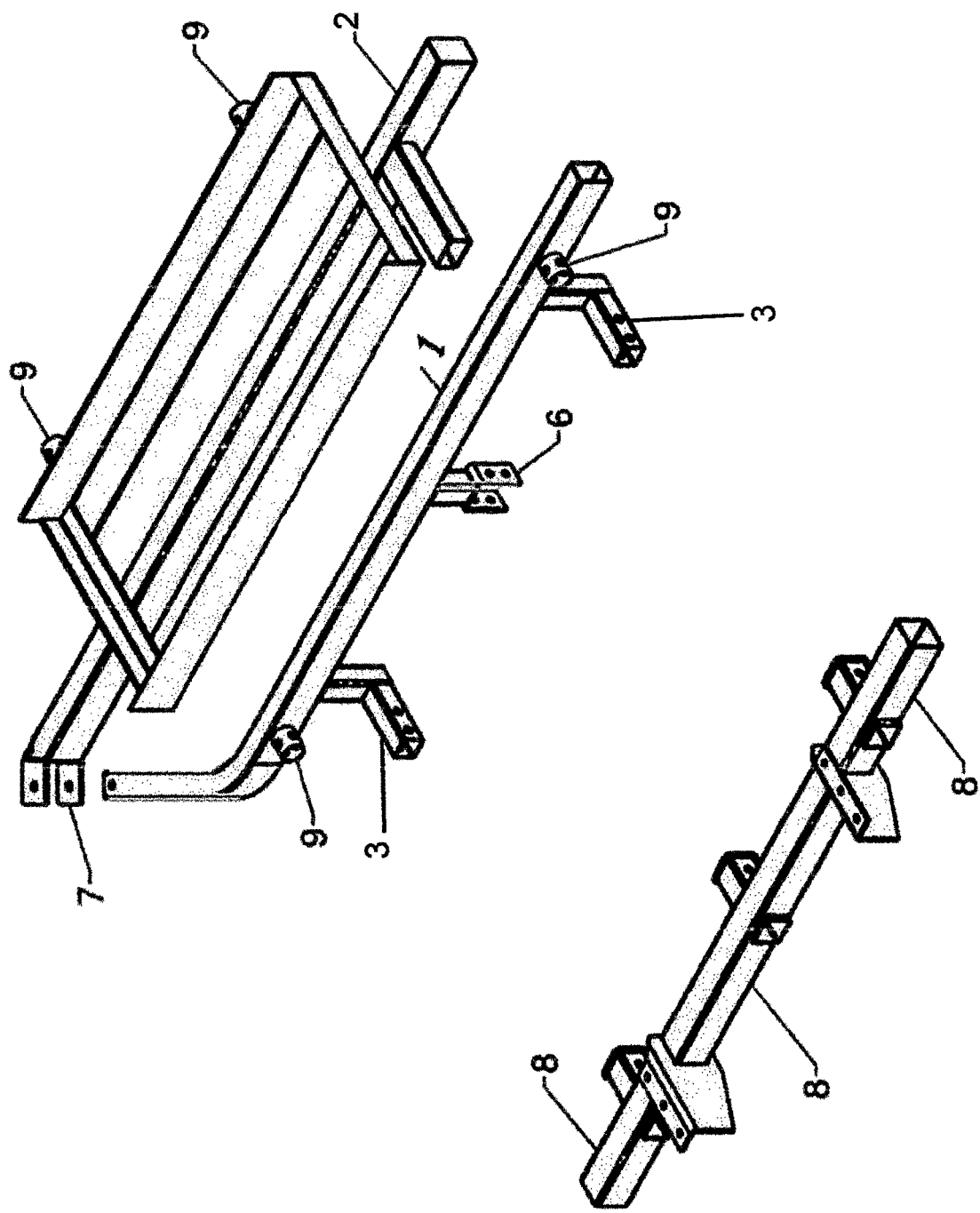

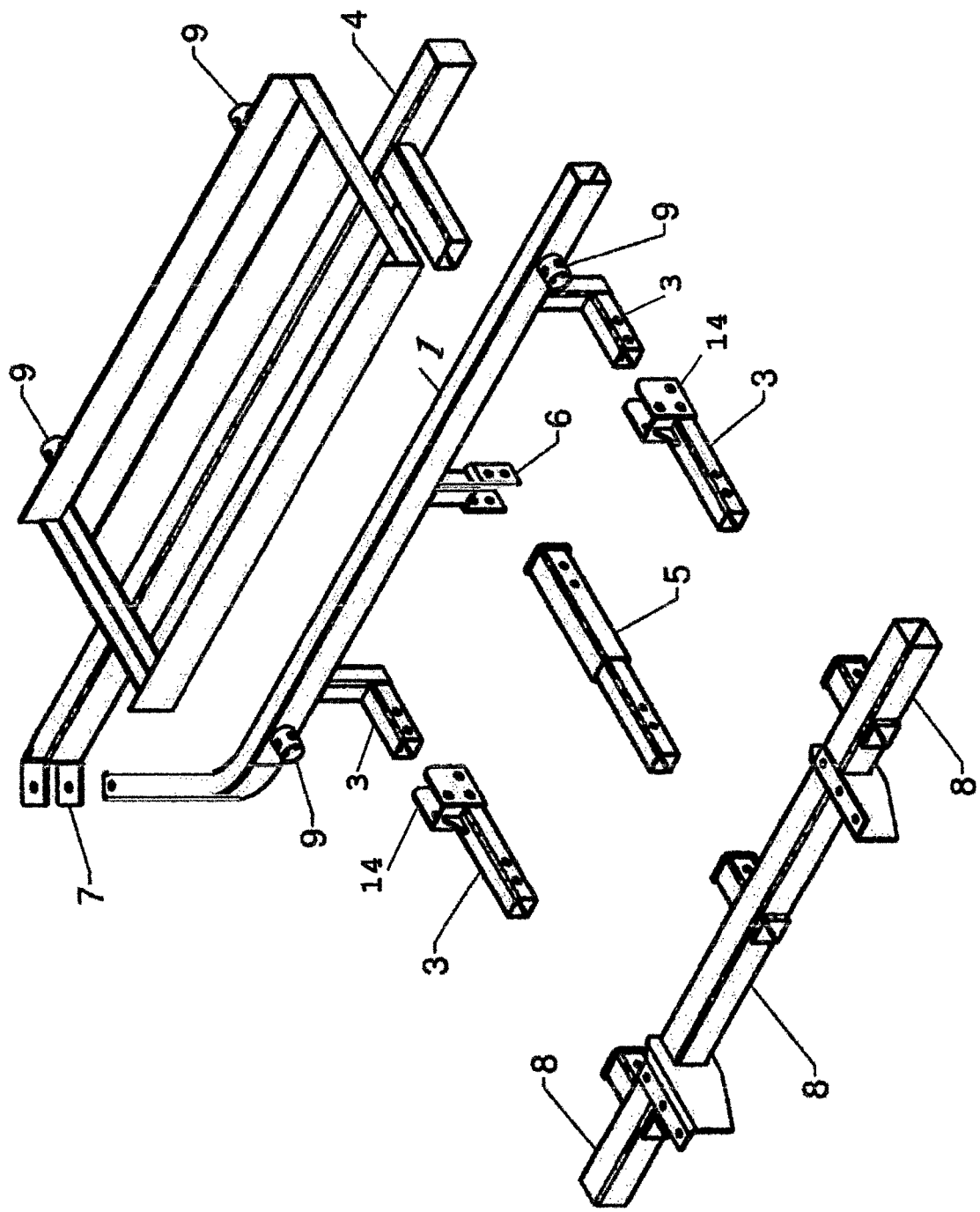

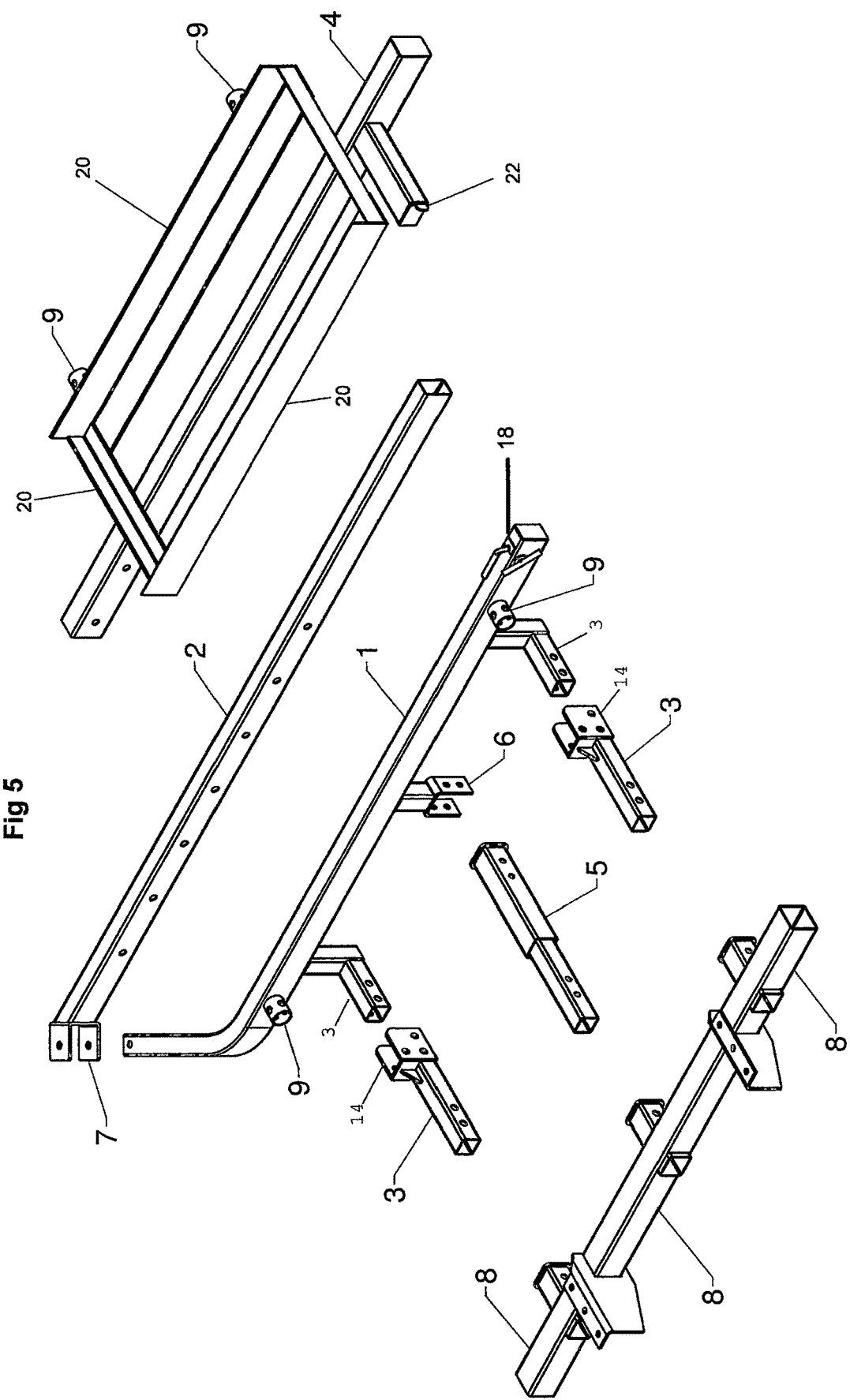

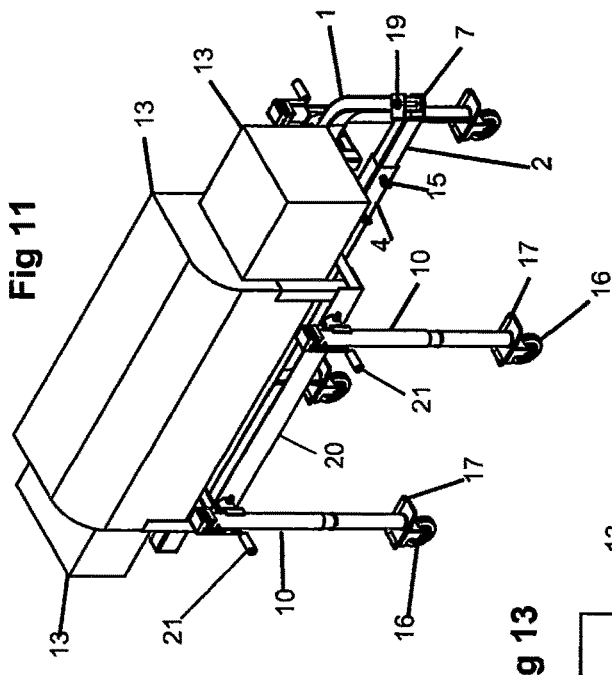
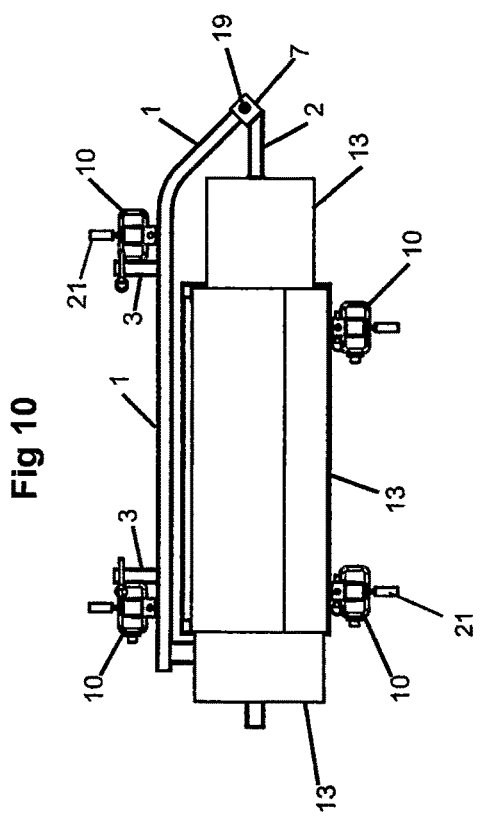
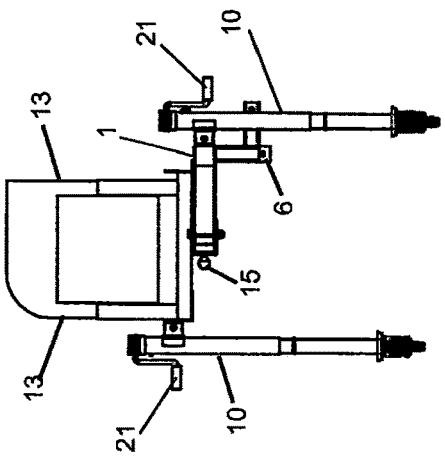

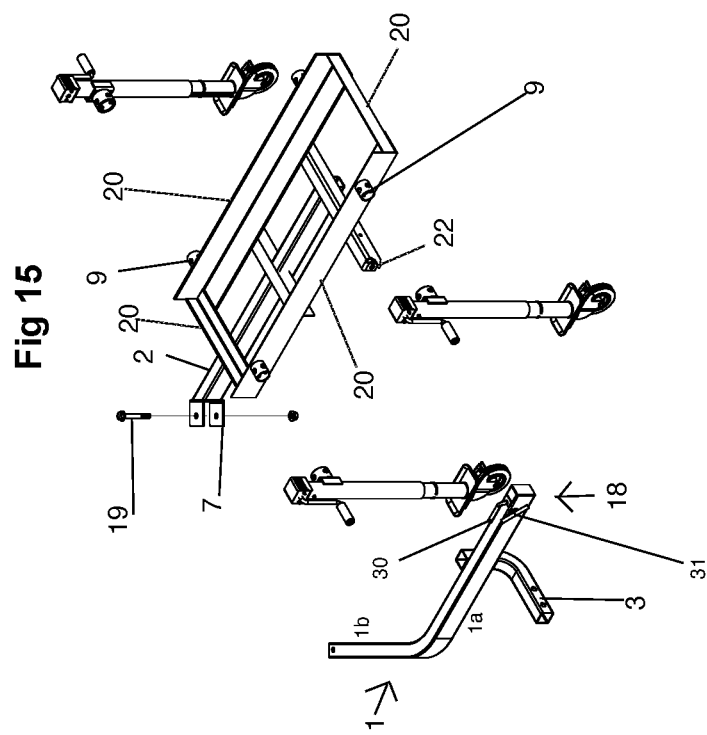
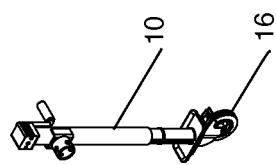
Fig 15
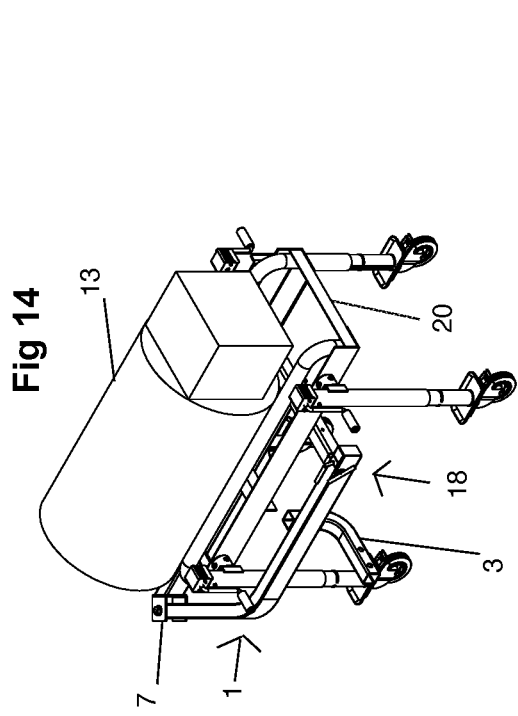
Fig 14
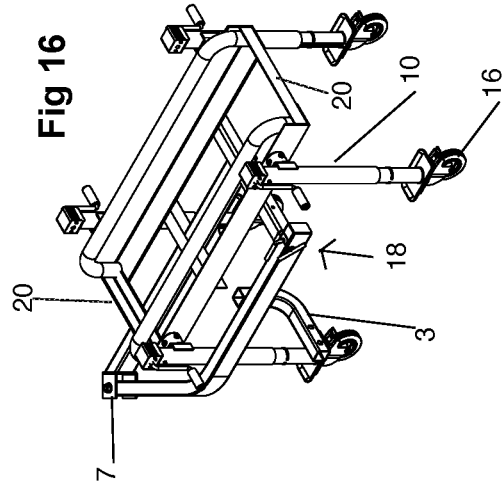
Fig 16

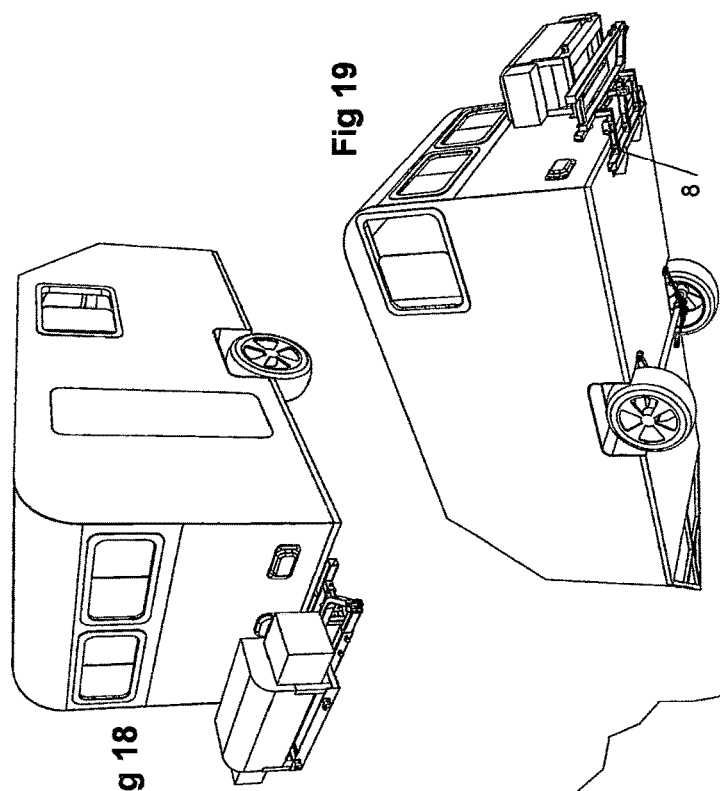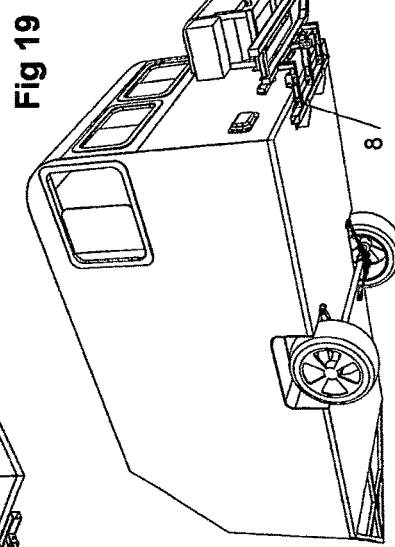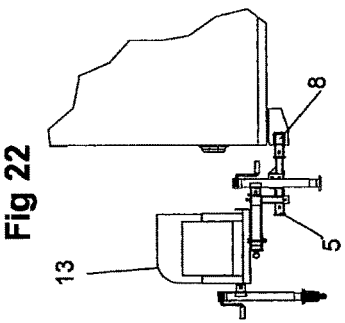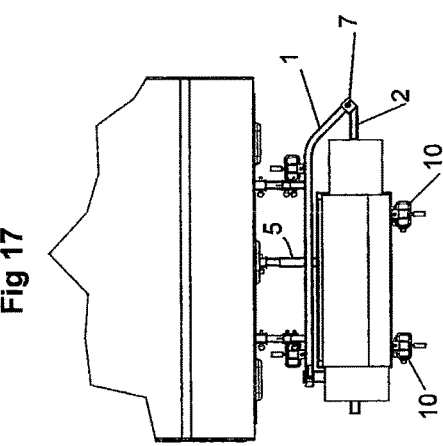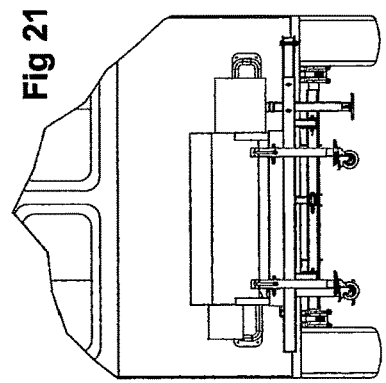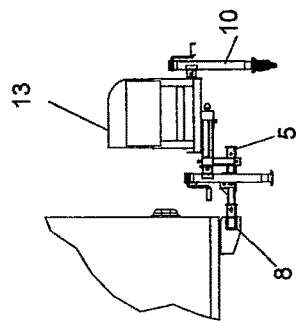

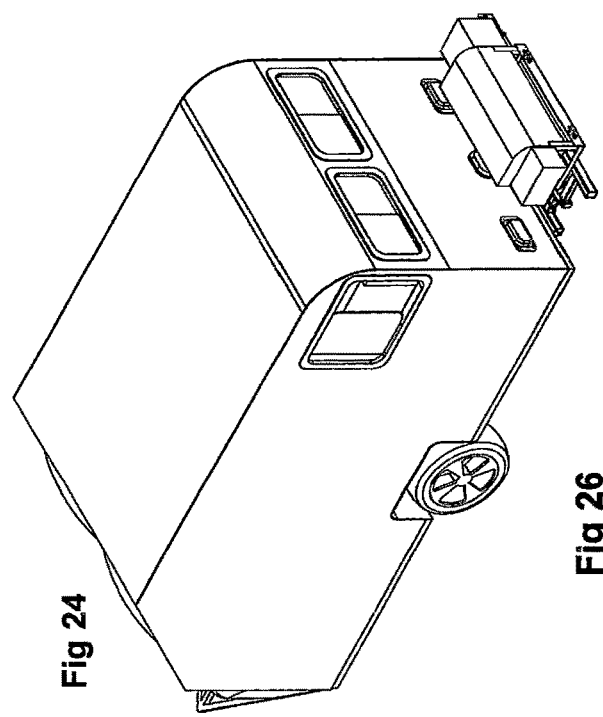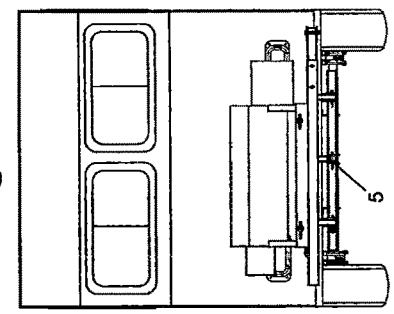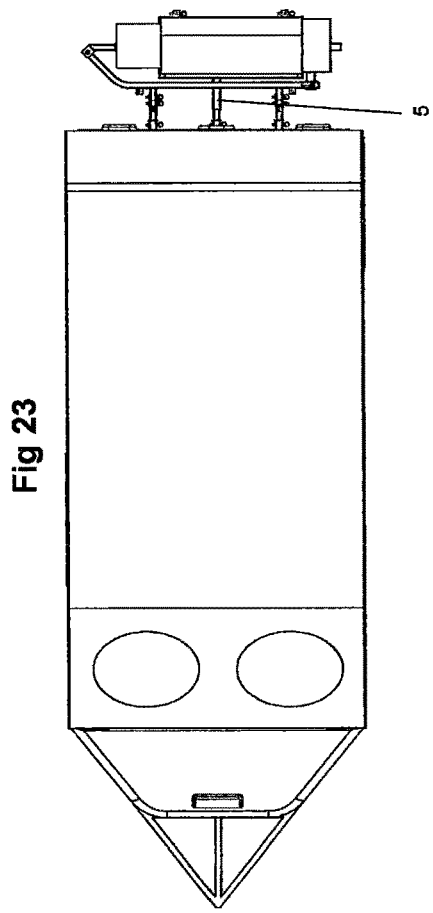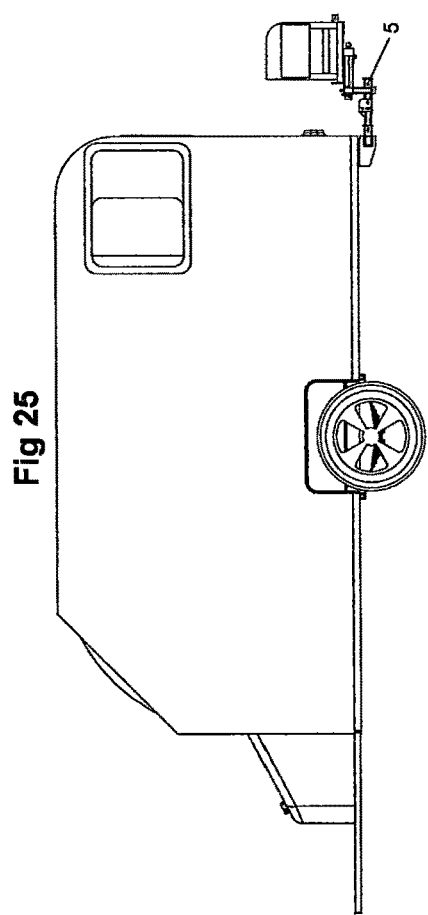

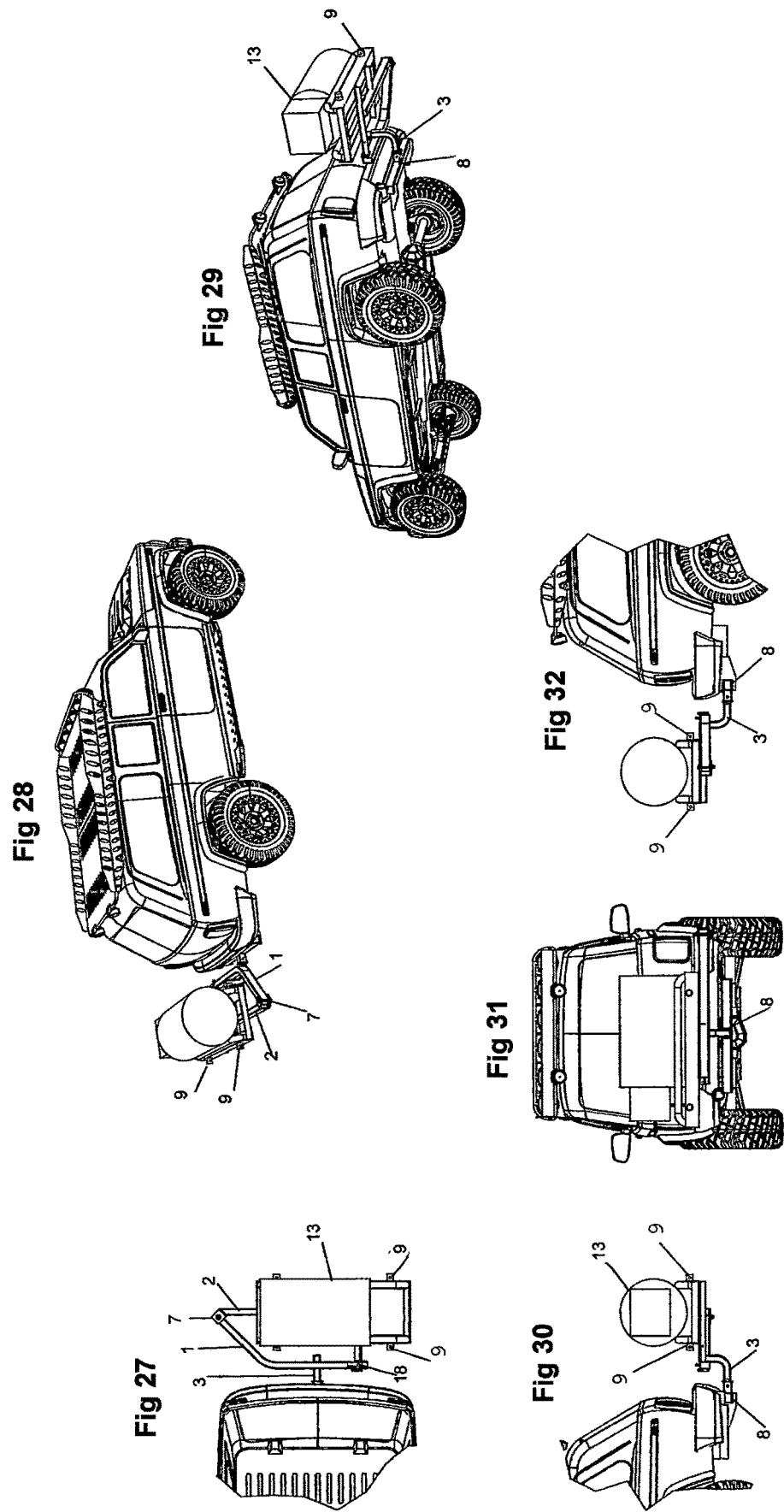

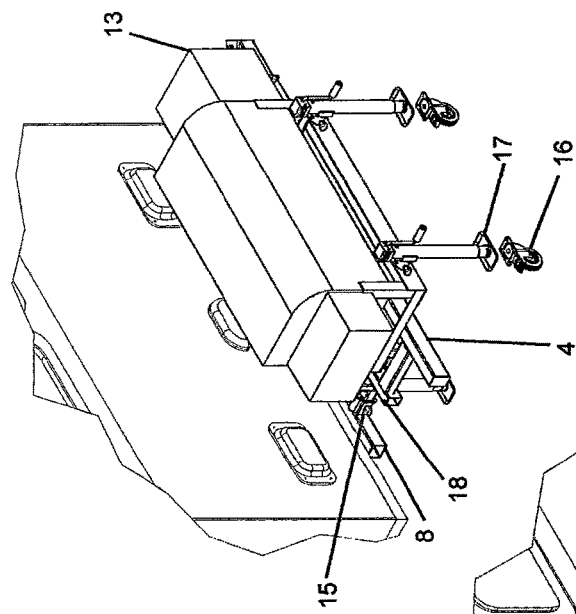
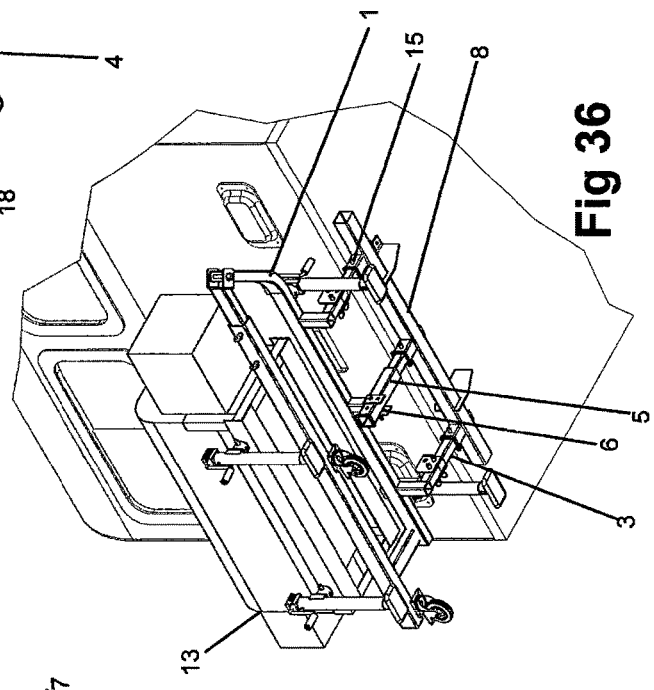
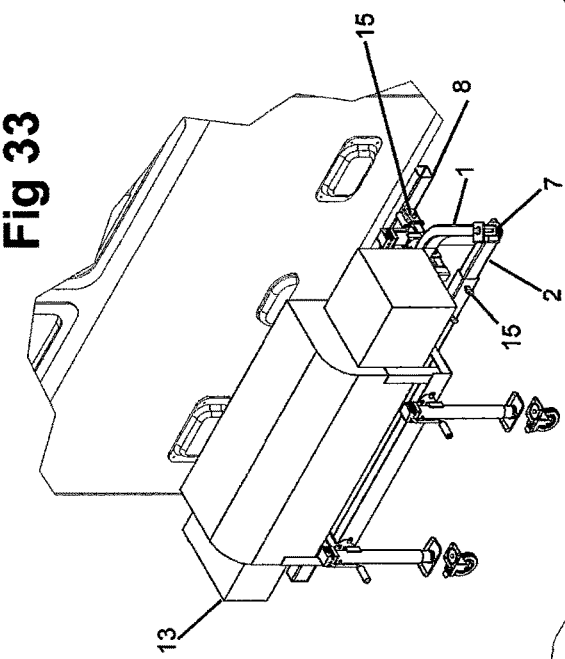
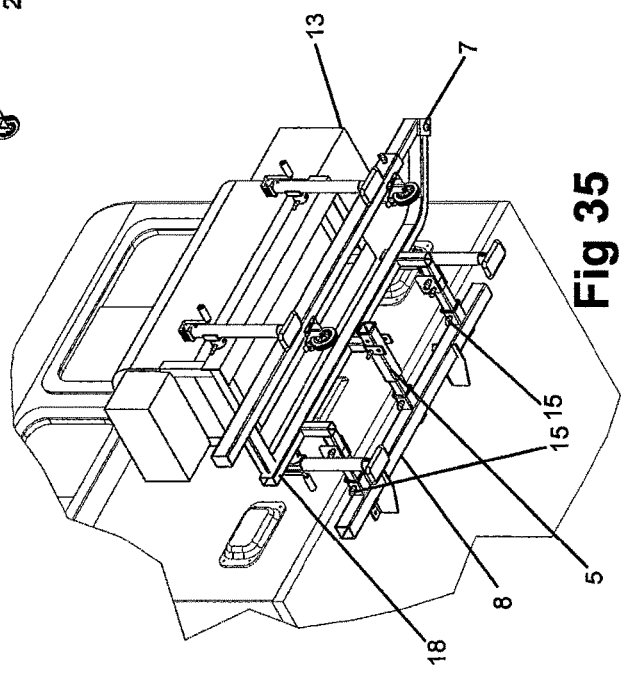

SWING AWAY TAILGATE BARBEQUE COOKING SYSTEM

This application claims priority from U.S. Provisional Application Ser. No. 63/207,249, filed on Feb. 19, 2021 to the fullest extent permitted by law.

BACKGROUND OF INVENTION

The present invention concerns a mobile cooking apparatus that can be transported by a vehicle or operated as a stand-alone unit at home. When supported by a vehicle, the connection point is at the vehicle mounted hitch receiver. The unit is also capable of swinging away from the vehicle to access the rear of vehicle, position the cooking apparatus for use, or position the unit further away from the vehicle in a location more desirable for cooking.

As an avid tailgater at sporting events and a camping enthusiast, having a device that allowed for cooking in different ways in a tailgating and camping environment was desired. Something more than a simple propane grill or a charcoal grill. Something that offered both cooking options and more. A device that could be transported outside of the vehicle in order to keep grilling odors out of the vehicle, as well as save room in the vehicle for additional items was needed. Also, an outdoor cooking apparatus that was easily operational and could supply enough food for a large crowd of people was desired. Plus, a device that could be easily connected and disconnected to a vehicle or RV. There are small grilling units that can be attached to a vehicle hitch receiver as well as small grilling units that can be permanently or temporarily attached to a recreational vehicle, but none large enough or with the ability to provide multiple cooking options, such as offset smoking, pellet cooking, charcoal grilling, propane grilling, frying, searing or other, in a single unit that can be attached to a vehicle or RV. Additionally, there is a need for a cooking apparatus that can swing away from the carry vehicle to provide access to the rear of the vehicle, to provide added distance from the vehicle for cooking, and to create a cooking space in a more favorable position at campsites or tailgating environments. Again, there are small grilling units that would swing away from the vehicle, but none large enough to provide the cooking area desired to feed a crowd. Plus, these small swing, away units do not offer multiple cooking options. There was a need to find a cooking device that could not only be in use while connected to a vehicle or RV, but could also be in use at home as a stand-alone cooking unit. None of the previous art found has a cooking apparatus with the size and mobility described herein that can function as a stand-alone cooking unit as well as a mobile, swing away cooking unit mounted on a vehicle or RV.

Previously, various devices have been used and proposed to carry a cooking apparatus, such as a grill, on the exterior of a vehicle. Many of these previous suggestions that provide similar swing-away characteristics are much smaller in cooking capacity, and are not designed to be a stand-alone cooking units. Additionally, these suggestions require manual lifting to remove the units from the vehicle, therefore, limiting the size and weight of the unit.

Previously, suggested devices used for cooking do not provide an easy detachment means from the vehicle. Most of the suggestions require for the unit to be carried by hand and connected or disconnected to the hitch receiver while manually holding the entire unit. Having the user align the connections while carrying the unit can be very difficult, cumbersome, and strenuous. Designing a device with larger cooking capacities that could be easily removed from a vehicle by a single person without having to lift the entire unit is needed.

Additionally, previously suggested devices have further limitations and shortcomings. Some of these limitations and shortcomings include: they tend to obstruct the opening and closing of a rear door or tailgate, tend to allow excessive play or twisting by the frame assembly and device, are unable to quickly and easily attach or remove the device from vehicle, are unable to position the device on a level plane when parked on uneven ground, do not provide enough cooking area to support a large gathering, are unable to use the device when not attached to a vehicle. The present invention eliminates the above mentioned limitations and shortcomings.

The prior art discloses a number of hitch supported pieces for uses that include cargo carry and cooking purposes. Some improvements to prior art include: added stability by using two connection points to the mounted hitch receiver on recreational vehicles, the ability to easily disconnect the unit by one person due to the adjustable legs with wheels on the unit, the ability to swing heavier loads due to the added ground support of the adjustable legs with wheels, ability to use as a stand-alone cooking apparatus, flexible mounting of the cooking apparatus to be positioned either facing in the forward or rearward direction of the vehicle when mounted for travel, telescoping arm to extend the cooking unit further away from the vehicle, folding shanks on connecting arms to make the unit more compact for storage or stand-alone use.

In summary, prior art provided no suggestions that could provide a cooking apparatus with the desired size and mobility to use in tailgating and camping environments with the advantages, benefits, or improvements as the present invention.

SUMMARY OF INVENTION

The objective of the present invention is to provide the ability to transport a cooking apparatus that is larger and heavier than any existing cooking devices currently suggested. The present invention provides a product with more cooking capacity and options for camping and tailgating than any previous suggestion. The present invention can be used in a mobile mode while attached to a vehicle, or in a stand-alone mode that can be utilized at home or remote location. The present invention is easily transported from one location to another with the ability to be attached or detached from a vehicle by a single person. Additionally, the present invention incorporates elements that enable positioning the unit in a plurality of orientations and on uneven terrain.

Some elements of the supporting assembly for the cooking apparatus includes support members, rotational capabilities, and adjustable to provide, in combination, maneuvering capabilities for the cooking apparatus to be positioned in a plurality of orientations to the carry vehicle, to adjust the elevation of the unit for connection to vehicles of different heights, to level the cooking apparatus for use, to provide support and maneuverability, to connect and disconnect the unit from the carry vehicle, and to support and attach the unit to the carry vehicle for transportation.

Numerous other features, objects, improvements, and functionality of the present invention will be readily apparent to those of ordinary skill in the art upon a reading of the following detailed description of the presently preferred, but nonetheless illustrative, embodiments of the present invention when taken in conjunction with the accompanying drawings. In this respect, it is to be understood that the invention is not limited in its application to the details of construction and to the arrangements of the components set forth in the following description or illustrations. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the objectives of the present invention. Therefore, it is important that the claims be regarded as including such constructions insofar as they do not depart from the spirit and scope of the present invention.

BRIEF DESCRIPTION OF THE DRAWINGS

FIG. 1 is a detailed view of an embodiment in a 90 degree swing out position detailing how the unit is connected to a vehicle hitch receiver and attachments for support.

FIG. 2 is a detailed view of an embodiment in a 90 degree swing out position while extended via a telescoping feature.

FIG. 3 is an explosion view of an embodiment detailing the elements and sections.

FIG. 4 is an explosion view of an embodiment detailing elements and sections of FIG. 3 to include additional features of a folding connecting shank and a hitch receiver extension.

FIG. 5 is an explosion view of an embodiment detailing elements and sections of FIG. 4 to include an additional telescoping feature.

FIG. 10 is a top view of an embodiment also referred to as method 100 detailing elements and connecting point for this embodiment in a stand-alone mode, not connected to a carry vehicle.

FIG. 11 is an above and angled view of FIG. 10 to provide another view of the elements and connecting points for clarity and understanding.

FIG. 12 is a view from the front perspective of FIG. 10 showing the elements and connecting points for clarity and understanding.

FIG. 13 is a side view of FIG. 10 showing the elements and connecting points for clarity and understanding.

FIG. 14 is an above angled view of an embodiment also referred to as method 200 in a stand-alone mode detailing elements and connecting points.

FIG. 15 is an explosion view of FIG. 14 sections 1, 2, and adjustable legs showing elements and connecting points for clarity and understanding.

FIG. 16 is an above angled view of FIG. 14 excluding the cooking apparatus for clarity and understanding of elements and connecting points.

FIG. 17 is a top view of an embodiment connected to an RV in the traveling mode detailing elements and connecting points.

FIG. 18 is an angled view of an embodiment connected to an RV in the traveling mode with adjustable legs disconnected.

FIG. 19 is a below angled view of an embodiment connected to an RV in the traveling mode detailing the connection points to the carry vehicle.

FIG. 20 is a side view of an embodiment connected to an RV in the traveling mode with adjustable legs connected for maneuvering or stabilizing the cooking apparatus.

FIG. 21 is a rear view of an embodiment connected to an RV in the traveling mode with adjustable legs connected for maneuvering or stabilizing the cooking apparatus.

FIG. 22 is an opposite side view of FIG. 20 to provide clarity and understanding of the elements and connecting points.

FIG. 23 is a top view of an embodiment connected to an RV in the traveling mode detailing the center receiver hitch extension.

FIG. 24 is an above angled view of FIG. 23 for added clarity and understanding.

FIG. 25 is a side view of FIG. 23 for added clarity and understanding.

FIG. 26 is a rear view of FIG. 23 for added clarity and understanding.

FIG. 27 is a top view of an embodiment connected to an SUV in the traveling mode detailing elements and connection points including the vehicle receiver hitch and connecting bar.

FIG. 28 is an above angled view of FIG. 27 for added clarity and understanding of the elements and connection points.

FIG. 29 is a below angled view of FIG. 27 for added clarity and understanding of the elements and connection points.

FIG. 30 is a driver's side view of FIG. 27 for added clarity and understanding of the elements and connection points.

FIG. 31 is a rear view of FIG. 27 detailing location of vehicle hitch receiver.

FIG. 32 is a passenger's side view of FIG. 27 for added clarity and understanding of the elements and connection points.

FIG. 33 is an above angled view from the passenger's side of an embodiment connected to an RV in the traveling mode detailing elements and connecting points.

FIG. 34 is an above angled view from the driver's side of FIG. 33 for added clarity and understanding of the elements and connection points.

FIG. 35 is a below angled view from the driver's side of FIG. 33 for added clarity and understanding of the elements and connection points.

FIG. 36 is a below angled view from the passenger's side of FIG. 33 for added clarity and understanding of the elements and connection points.

REFERENCE POINTS

Figure 7:
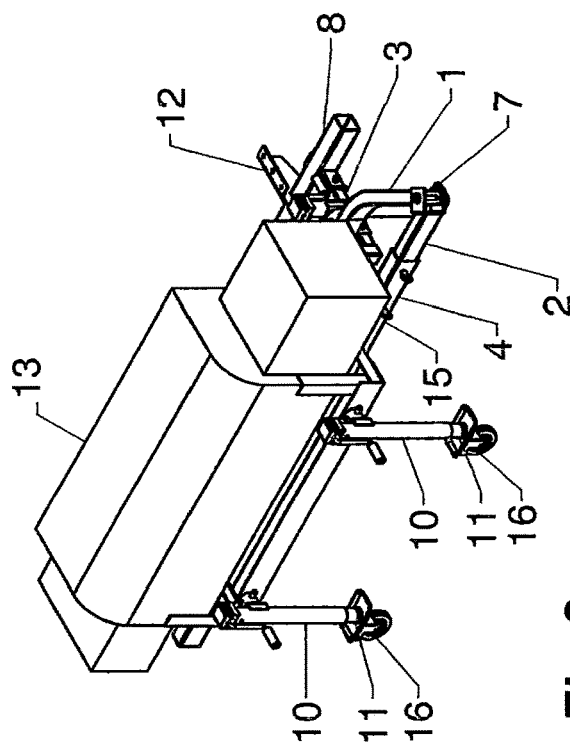
FIG. 7 is an above and angled view of FIG. 6 to provide another view of the elements and connecting points for clarity and understanding.
Figure 9:
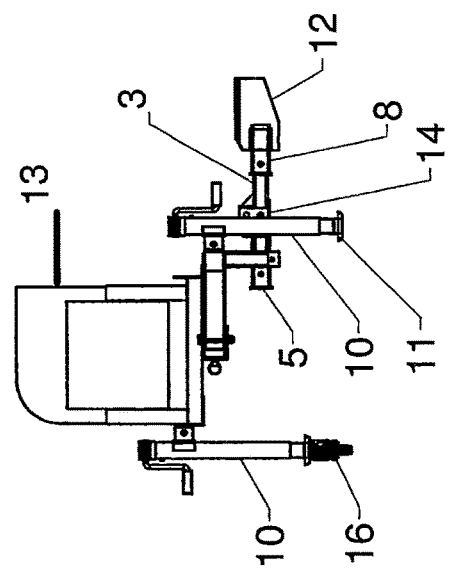
FIG. 9 is a side view of FIG. 6 showing the elements and connecting points for clarity and understanding.

1. Mounting bar
2. Swing away bar

3. Connecting arm
4. Telescoping bar
5. Center receiver hitch
6. Support for center receiver hitch
7. Pivot point
8. Vehicle receiver hitch
9. Connection for adjustable legs
10. Adjustable legs
11. Telescoping leg
12. Vehicle Receiver hitch mounting bracket
13. Cooking apparatus
14. Folding mechanism for connecting arm
15. Locking pin
16. Caster wheel
17. Flat foot
18. Locking mechanism
19. Pivot bolt
20. Support frame
21. Rotary handle
22. Lip
23. 5th wheel RV trailer
24. RV travel trailer
25. RV motorhome
26. Embodiment in traveling position
27. Embodiment in 90 degree swing out position
28. Embodiment in 180 degree swing out position

DETAILED DESCRIPTION OF THE
PREFERRED EMBODIMENTS

The Swing Away tailgate BBQ System is to be used as a mobile cooking unit, typically used for tailgating, camping, food trucks, on-site catering, and other events that will enable the user to easily transport and set up a cooking unit. It is also intended for use at home as a stand-alone cooking unit that can be placed on a home deck or patio for example. The ease of connecting and disconnecting also make this a simple addition to a vehicle or RV that can be disconnected and stored for winterization or other storage purposes. The dual functionality of a mobile and stand-alone cooking unit is one of the benefits of the Swing Away Tailgate BBQ System. This and other benefits of one or more aspects will become apparent from a consideration of the ensuing description, operation, and accompanying drawings.

For the purposes of promoting an understanding of the principles of the invention and presenting the currently understood modes of operation, reference will now be made to the embodiments illustrated in the drawings and specific language will be used to describe the same. It will be understood that no limitation of the scope of the invention is intended, with such alterations and further modifications in the illustrated device and such further applications of the principles of the invention as illustrated therein being contemplated as would normally occur to one skilled in the art to which the invention relates.

Several different embodiments of the present invention are illustrated in the drawings and narration. One embodiment for trucks, SUVs, and other vehicles with standard widths is also referred to as method 200. Another embodiment that would be for recreational vehicles, food trucks, or any vehicles or trailers that are wider than conventional pickup trucks, SUVs and motor vehicles is referred to as method 100. One distinction between these two embodiments is that method 100, for wider vehicles, will have two or more supporting members, referred to as connecting arms 3, that connect to the carry vehicle. Method 200, for vehicles such as pickup trucks and SUVs will have a single connecting arm 3 used to connect to the vehicle's center receiver hitch. Another embodiment is referred to as method 300 and includes a telescoping feature that can be incorporated into both method 100 and method 200 embodiments. It should also be understood that any feature described applies to all embodiments.

The Swing Away Tailgate BBQ Cooking System comprises a base frame that is described in three sections, 1st section, 2nd section, and 3rd section. A 4th section will also be described that includes the embodiments of the vehicle connecting attachment. The 1st section comprises of the mounting bar 1, connecting arms 3, locking mechanism 18, and attachments. The mounting bar 1 has a first straight portion 1a and a second angled portion 1b located in the same substantially horizontal plane of the first straight portion, the second portion being angled at approximately 45 degrees relative to the first portion. Section 2 consists of a swing away bar 2, cooking apparatus support frame 20, connections for adjustable legs 9, pivot point 7, pivot bolt 19, and attachments. Section 1 and Section 2 are pivotally attached together on one end at the pivot point 7. Section 1 and Section 2 are joined together on the other end by a locking mechanism 18 that is releasable. Section 3 consists of the cooking apparatus 13 and attachments. Sections 1, 2 and 3 joined together comprise a stand-alone cooking unit. FIG. 14 illustrates method 200 with sections 1, 2 and 3 together with adjustable legs 10 connected to the support frame 20 in the stand-alone mode. FIG. 16 illustrates method 200 sections 1 and 2 only. FIG. 15 illustrates an explosion view with section 1 detached from section 2, along with the adjustable legs 10 detached from section 2. FIG. 15 shows the connections for adjustable legs 9 joined with the support frame 20 for this embodiment. FIG. 14 provides a view of method 200 assembled. FIG. 15 provides a view of elements of method 200 detached from each other for a better understanding of the arrangement. FIG. 14 and FIG. 16 illustrate method 200 in the stand-alone mode to which the locking mechanism 18 secures sections 1 and 2 together. Section 3, is secured to section 2 at a plurality of points on the support frame 20. FIG. 14-16 illustrate elements of an embodiment, method 100, in the stand-alone mode.

FIG. 10-13 illustrate various views of method 100 with sections 1, 2, and 3 joined together with adjustable legs 10 connected in the stand-alone mode. FIG. 10 illustrates an overhead view with adjustable legs 10 connecting to the mounting bar 1 on the side where the unit would connect to a vehicle via the connecting arms 3. FIG. 11 illustrates an overhead angled view with the adjustable legs 10 connected to the support frame 20 on the side of the unit opposite the connecting arms 3. The adjustable legs 10 are joined to each member via the connection for adjustable legs 9. The connections for adjustable legs 9 are shown in more detail in FIG. 5 for this embodiment. FIG. 11 and FIG. 34 illustrate that the adjustable legs 10 can attach either a wheel 16 or a flat foot 17 at the base for maneuvering or stabilization. The wheel 16 or flat foot 17 is secured to the telescoping leg 11 with a pin. FIG. 12 illustrates that each adjustable leg 10 has a rotating handle 21 and a telescoping leg 11 for height adjustments. FIG. 10-13 illustrate elements of an embodiment, method 100, in the stand-alone mode.

The 4th section is mounted to the vehicle and used to connect Sections 1, 2, and 3 to the vehicle for transportation and use in a mobile mode for tailgating, camping, and cooking in a mobile location. Section 4 is the element of one embodiment used to connect a stand-alone cooking system to a vehicle or trailer. A vehicle hitch receiver 8 is detailed herein. However, other embodiments could be secured to other parts of the carry vehicle body, such as directly to the frame or bumper. FIG. 3 illustrates one embodiment with sections 1, 2, and 4 in an explosion view to separate each section for a better explanation of the arrangements. FIG. 3 is an embodiment of method 100 with two connecting arms 3. FIG. 3 includes a vehicle hitch receiver 8 with three female receiver hitch couplers. The center female receiver hitch coupler would typically be located in the center of the vehicle's frame. Section 1 mates with section 4, vehicle hitch receiver 8, when the connecting arms 3 are inserted into the female receiver couplers. Each union is secured with a locking pin 15. FIG. 33-36 illustrate various views of locking pins 15 securing the connecting arms 3 to the vehicle hitch receiver 8. Securing and supporting the unit to a carry vehicle in this manner, with two connecting arms 3, allows for the vehicle's center receiver hitch to be used for other purposes, such as flat towing another vehicle. Many RVs will pull behind them a smaller vehicle with all four wheels on the road, also known as flat towing. FIG. 1-2, FIG. 4-5, FIG. 23-26, and FIG. 35-36 illustrate embodiments with the center receiver hitch extension 5 available for other towing or vehicle connections. FIG. 1-5 show the support for center hitch receiver extension 6, which is to provide added stability for the center receiver extension 5. Additionally, having two connecting arms 3 adds strength, support, and stability to the entire system when traveling or when being swung away from the carry vehicle for use.

FIG. 14-16 illustrate an embodiment of method 200 using a single connecting arm 3. FIG. 27-32 also illustrate various views of this embodiment with a single connecting arm 3 mated with a vehicle receiver hitch 8. FIG. 27-32 show method 200 connected to a carry vehicle in the traveling mode with adjustable legs detached from unit. In FIG. 27-32 the entire system is supported to the vehicle hitch receiver 8 by a connecting bar 3. FIG. 14-16 show method 200 in the stand-alone mode with adjustable legs 10 supporting the entire system.

The cooking apparatus 13 can be mounted in two different orientations, either facing the forward direction of the carry vehicle or the rearward direction of the carry vehicle. This will provide functionality for the user to orient the cooking apparatus 13 in the manner that is most desirable to the user. For example, the cooking apparatus 13 can be mounted facing the forward direction of the carry vehicle so that it can be swung out from the traveling position and used in a tailgating orientation, so that the user can stand behind the carry vehicle and cook. FIG. 2 illustrates a 90 degree orientation in which the front of the cooking apparatus 13 is positioned so that the user can stand behind the carry vehicle and cook. In FIG. 2, to illustrate this it should be noted the vehicle hitch receiver 8 would be mounted at the rear of a vehicle or RV. The cooking apparatus 13 can also be mounted facing the rearward direction of the carry vehicle so that it can be swung out from the traveling position and used in a camping orientation, so that the user can stand along the side of the carry vehicle and cook. FIG. 1 illustrates a 90 degree orientation in which the front of the cooking apparatus 13 is positioned so that the user can stand to the side of the carry vehicle and cook. In FIG. 1, to illustrate this it should be noted the vehicle hitch receiver 8 would be mounted at the rear of a vehicle or RV. It should also be noted that FIG. 1 and FIG. 2 show the cooking apparatus 13 at approximately a 90 degree rotation from the traveling position. The cooking apparatus 13 can rotate more or less than these illustrations show, up to approximately 180 degrees from the traveling position.

Another embodiment includes a telescoping feature allowing the cooking apparatus 13 to be extended further away from the carry vehicle when connected and swung out for use. This embodiment is also referred to as method 300. The telescoping feature of method 300 can be incorporated into method 100, method 200, or any other embodiment. The telescoping feature will allow the cooking apparatus 13 to be extended further away from the pivot point 7 and the carry vehicle when pivoting away and into position for use. FIG. 1-2 and FIG. 5 illustrate elements of method 300. One improvement this embodiment includes is a telescoping bar 4 with inner dimensions greater than the outer dimension of the swing away bar 2 so that the swing away bar 2 will fit within the channel of the telescoping bar 4. In the method 300 embodiment, the support frame 20 and attachments are mounted on the telescoping bar 4. The swing away bar 2 inserts inside the telescoping bar 4 when in the traveling or stand-alone modes. The swing away bar 2 and the telescoping bar 4 are secured in place with a locking pin 15. FIG. 1 illustrates method 300 incorporated into method 200 in a 90 degree swing out position, but not extended via the telescoping feature. In FIG. 1, the telescoping bar 4 is retracted and secured in place with a locking pin 15. In FIG. 1, the swing away bar 2 is fully inserted into the telescoping bar 4. FIG. 2 illustrates method 300 incorporated into method 200 in a 90 degree swing out position, and extended further away from the pivot point 7 and the vehicle receiver hitch 8. In FIG. 2, the telescoping bar 4 is extended and secured in place with a locking pin 15. FIG. 2 illustrates how a plurality of holes in the swing away bar 4 can be used to secure the cooking apparatus 13 into a plurality of extended lengths from the pivot point 7. It should be noted that FIG. 1 and FIG. 2 illustrate the telescoping feature of method 300 in a 90 degree pivoted position, and this feature can be utilized in a lesser or greater degree pivoted position. FIG. 5 provides an explosion view of the telescoping feature incorporated into method 200 for a better understanding of the arrangements. In FIG. 5, the swing away bar 2 with a plurality of holes inserts inside the telescoping bar 4 when assembled for use. In FIG. 5, the swing away bar 2 is secured to the mounting bar 1 at the pivot point 7 with a pivot bolt on one end. In FIG. 5, the telescoping bar 4, with the swing away bar 2 inserted, is secured to the mounting bar 1 on the other end with the locking mechanism 18.

The adjustable legs 10 are another feature of the embodiments that allow for easy disconnection from a carry vehicle, support for the system in the stand-alone mode, support for the system when swung away for use tailgating or camping, and leveling the cooking apparatus 13 in whichever mode or position it is in. The adjustable legs 10 can be disconnected from the system for traveling. FIG. 23-26 illustrate one embodiment in the traveling mode with the adjustable legs 10 disconnected and not shown. FIG. 33-36 illustrate one embodiment in the traveling mode with the adjustable legs 10 connected to the system. It should be noted the adjustable legs 10 can be connected to the system in an orientation perpendicular to the ground for support. The adjustable legs 10 can also be connected to the system in an orientation that is parallel to the ground for traveling. The connection for adjustable legs 9 has four holes that allow for a locking pin 15 to secure the adjustable leg 10 in an orientation that is perpendicular or parallel to the ground.

The locking mechanism 18 can have a plurality of designs to secure the mounting bar 1 with the swing away bar 2. One embodiment of the locking mechanism 18 illustrated in FIG. 15 is made by a pin 30 and threaded bolt screw 31. When the system is secured in place for transportation, there is a lip 22 on the swing away bar that extends slightly toward the vehicle. This lip 22 inserts into the mounting bar 1 through a hole and is secured by a spring mechanism. A bolt screw (31) is then tightened through the mounting bar and into the swing away bar to provide a multi-point locking mechanism 18. It should be noted that other embodiments could use an alternate locking mechanism to secure the system.

The cooking apparatus 13 is illustrated throughout the drawings in various ornamental designs. It should be noted that the cooking apparatus 13 has a plurality of designs and fuel types. The cooking apparatus 13 could utilize a single fuel source, such as propane. The cooking apparatus 13 could also utilize a plurality of fuel sources, such as propane, charcoal, smoke, electric, wood, wood pellets, or other means. The scope and spirit of the invention is to provide a plurality of models designed for the cooking needs of the end user. Therefore, embodiments will have cooking apparatus' with different ornamental designs and fuel sources.

Figure 6:
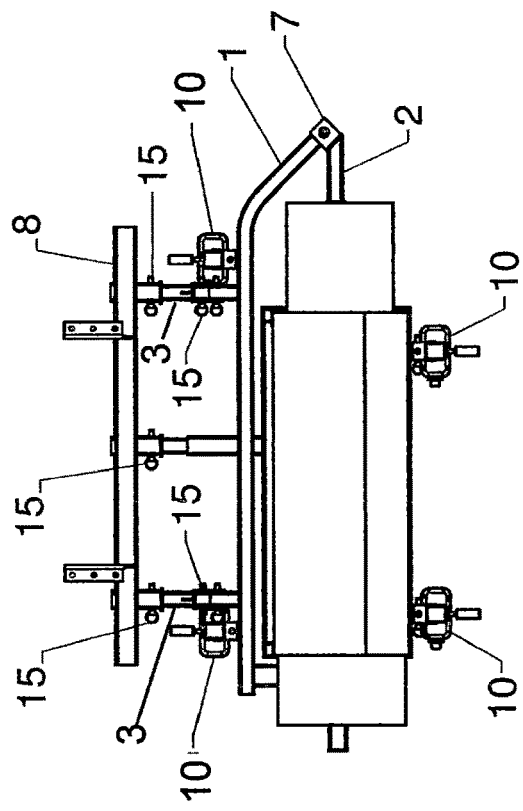
FIG. 6 is a top view of an embodiment also referred to as method 100 detailing elements and connecting points that include a vehicle receiver hitch for a carry vehicle.
Figure 8:
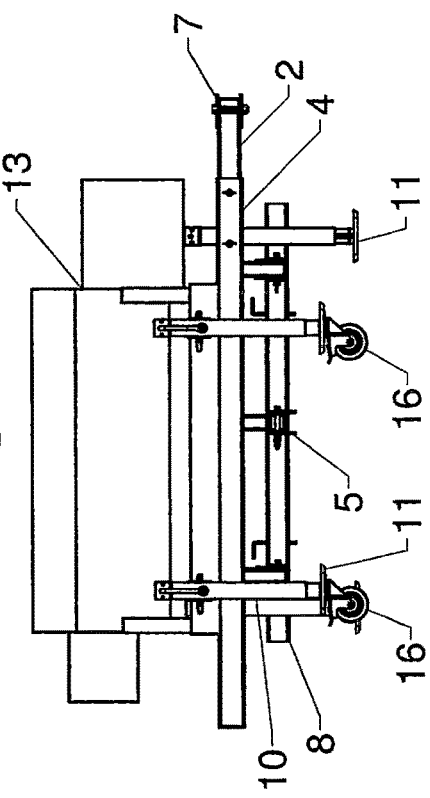
FIG. 8 is a view from the rear perspective of FIG. 6 showing the elements and connecting points for clarity and understanding.

To connect the unit to a carry vehicle, the user will maneuver the unit from the stand-alone position, illustrated in FIG. 11, to the carry vehicle hitch receiver 8, which will typically be at the rear of the carry vehicle, but could also be at the front if connection points are mounted in the front of the carry vehicle. The connecting arms 3 will be aligned to the vehicle receiver hitch 8 female couplers by using the adjustable legs 10 to elevate the cooking system to match the elevation of the carry vehicle receiver hitch 8 female couplers. The connecting arms 3 are then mated with the carry vehicle receiver hitch 8 female couplers, which are then secured with a locking pin 15. FIG. 6 illustrates these connections.

Once the system is connected to the vehicle receiver hitch 8 the adjustable legs 10 are then retracted so that the cooking system is fully supported by the carry vehicle at the vehicle hitch receiver 8. The adjustable legs 10 are then either rotated parallel to the ground or detached from the cooking system. The adjustable legs 10 are mated to the cooking system with round male and female unions, secured in either a parallel or perpendicular orientation to the ground by a locking pin 15. Once all adjustable legs 10 are no longer joined with the cooking system and in a perpendicular orientation to the ground, the cooking system is ready to be transported by the carry vehicle.

Figure 37:
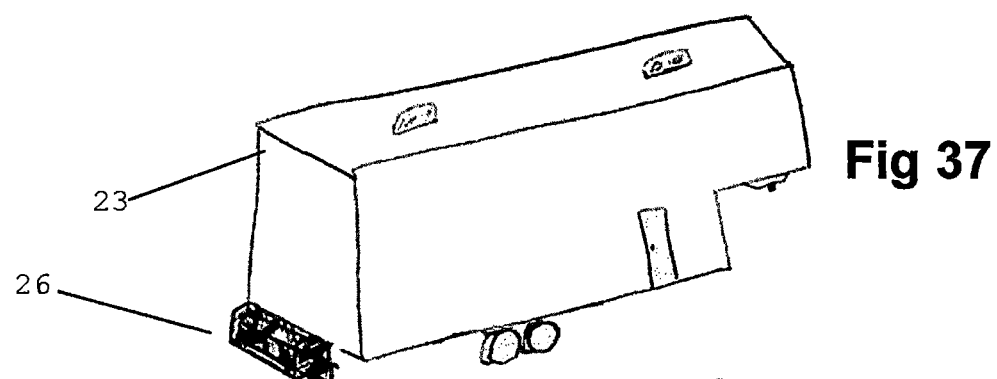
FIG. 37 is to illustrate an embodiment in the traveling mode connected to a 5th wheel camper trailer.
Figure 38:
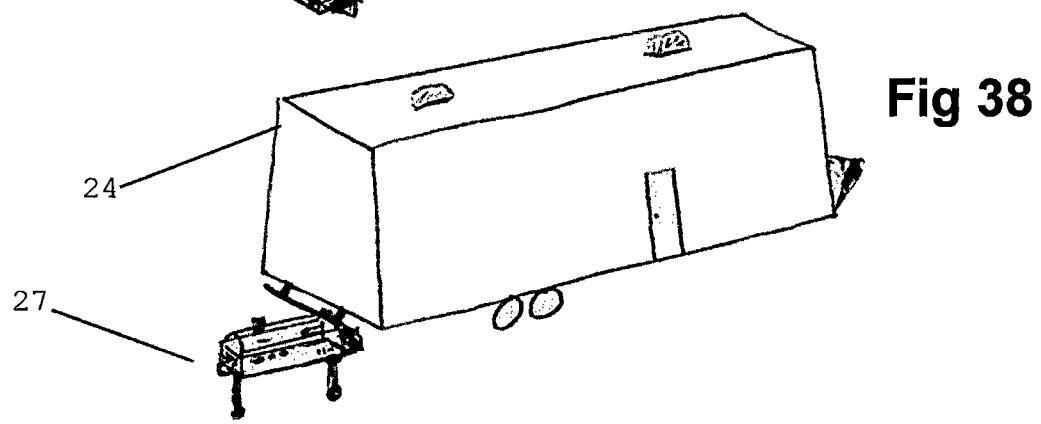
FIG. 38 is to illustrate an embodiment connected to a travel trailer with the cooking apparatus swung out in a 90 degree position and set up for cooking.
Figure 39:
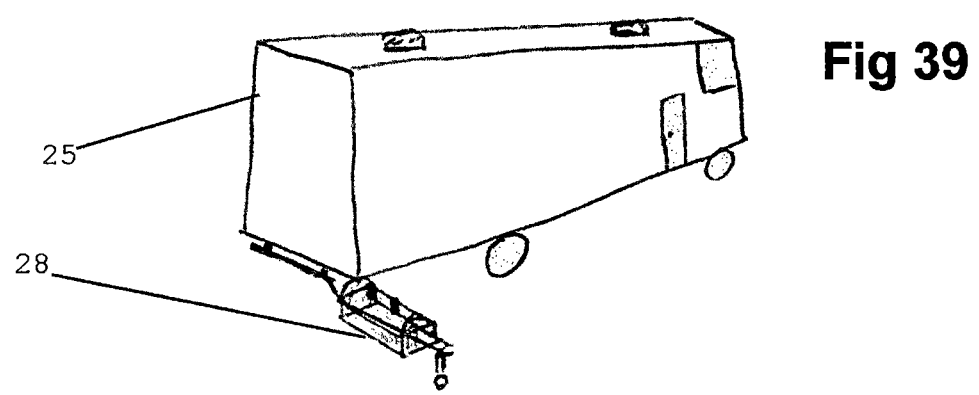
FIG. 39 is to illustrate an embodiment connected to a motorhome with the cooking apparatus swung out in a 180 degree position and set up for cooking.

Once the carry vehicle has arrived and is parked in a camping or tailgating type of location, the cooking apparatus 13 can be positioned in various orientations for cooking. The cooking apparatus 13 can be kept in the traveling mode and utilized for cooking. Or, the cooking apparatus 13 can be released from the traveling mode and pivoted away from the vehicle into a more favorable position. To pivot the cooking apparatus, an adjustable leg 10 can be secured to a connection for the adjustable leg 9 and lowered until the wheel 16 attached to the adjustable leg 10 is in contact with the ground. Next, the locking mechanism 18 is released. The cooking apparatus is then rotated away from the vehicle to the desired position. Examples of embodiments that position the cooking apparatus 13 in 90 degree pivoted positions are shown in FIG. 1-2. FIG. 37-39 are intended to illustrate an embodiment in various pivoted positions on various carry vehicles. Once in the desired position, the cooking apparatus height can be adjusted by one or more of the adjustable legs 10 to a level orientation for use. Additional adjustable legs 10 can by utilized to provide additional stability or height adjustments. It should be noted that stabilization, height adjustments, and usage of adjustable legs 10 will vary depending on the embodiment, user, and location. For example, some instances and embodiments will have no need to secure an adjustable leg for pivoting, as the pivot point 7 will support the cooking apparatus 13 and swing away bar 2. Other instances and embodiments will need the support of one or more adjustable legs 10 to pivot, level or stabilize the cooking apparatus 13. Due to the mobility of the cooking system, each location the unit is carried to will present different needs for pivoting, leveling, stabilizing and securing the cooking apparatus 13 for use. Therefore, it should be mentioned the steps described are optional and can be carried out in many different orders according to the need of the user.

The adjustable legs 10 are used to raise and lower the unit. This allows for the unit to be connected and disconnected on uneven ground. It also allows for the unit to be easily leveled when positioned for cooking in a tailgating or camping location. Due to the adjustable legs 10, the ability to position the unit is greatly enhanced. One or more of the adjustable legs 10 can be used to raise or lower the cooking unit to level the unit for optimal cooking performance. More adjustable legs 10 can be used to provide more stability if needed to the unit when in a swing out position, as shown in FIG. 1-2.

It will be necessary to have a plurality of embodiments to meet the specifications of different types of vehicles. For example, embodiments for larger recreational vehicles will have lengthier mounting bars 1 and swing away bars 2 for pivot clearance due to the vehicles being wider than trucks and SUVs. Embodiments for use on trucks and SUV's will not have as lengthy mounting bar 1 and swing away bars 2 due to their width. The need for different embodiments is primarily, but not exclusively, based on the width of the vehicle, any slide outs the unit may have, cargo bay doors, weight capacity limitations, and orientations the user desires to position the cooking apparatus 13 in.

Another embodiment of the system, shown in FIG. 2, has the ability to extend the cooking apparatus 13 further from the vehicle by pulling a locking pin 15 out of the swing away bar 2 and the telescoping bar 4, to allow for additional extension of the cooking apparatus 13. The cooking apparatus 13 can then be extended even further away from the vehicle or RV. The swing away bar 2 and the telescoping bar 4 are secured with a locking pin 15 through holes in each member. A plurality of holes on the telescoping arm 4 are spaced according to the desired telescoping distance. This embodiment is an optional design upgrade and can be incorporated into other embodiments. One of several benefits of the telescoping feature is the ability to position the cooking apparatus 13 even further away from the vehicle while still connected, which some users may prefer. For example, some recreational vehicles have slide outs near the back of the vehicle and more clearance from the vehicle is desired. Furthermore, some RVs have folding rear platforms that create outdoor decks or ramps for loading bikes and other toys. They are commonly referred to as toy haulers. Positioning the cooking apparatus 13 along the side of the RV can provide clearance to utilize the RV's deck or ramp. An additional benefit of the telescoping feature is that some users may desire for the heat generated when cooking to be further away from the vehicle.

In other embodiments, folding mechanism for connecting arms 14, are arranged between the connecting arms 3. One feature of the folding mechanism for the connecting arms 14, is the capability to rotate the connecting arms 3 and free up space when the system is in the stand-alone mode. Once disconnected from a carry vehicle, folding the connecting arms 3 allow for more clearance for storage or use as a stand-alone system. FIG. 4-5 illustrate the folding mechanism for connecting arms 14 in one embodiment that allows for pivoting 90 degrees upward. Other embodiments could pivot connecting arms 3 downward or to the side. Other embodiments could allow for a portion or the entire connecting arm 3 to be disconnected.

In another embodiment, the adjustable legs 10 are bonded to the unit and swiveled horizontally or vertically. Horizontally when in the traveling mode, and vertically when needed for support, disconnection, or in the stand-alone mode. One benefit of bonding the adjustable legs to the unit is added security from theft or misplacement of adjustable legs.

Another embodiment to increase or decrease ground clearance would come in the form of mechanical, hydraulic, pneumatic, electric or other means to adjust the elevation of the device. This method of adjustment could apply to the clearance of the device from the carry vehicle, such as raising or lowering the device while connected to the carry vehicle. This method of adjustment could also apply to the adjustable legs 10.

Materials other than that included in the preferred embodiments could be used. Some examples include: tubes or members constructed of plastic or lightweight material; structural injection to increase strength or decrease weight; titanium, aluminum, or other material used to increase strength or decrease weight; hardening of carbon steel; and other known and future alternate materials could be used in other embodiments to provide strength or weight advantages.

Another embodiment could use the carry vehicle body or bumper to mount a cooking system to the carry vehicle. In some cases, vehicle receiver hitches are not mounted to the vehicle frame, rather the receiver hitch is mounted to the bumper or body of the vehicle.

Another embodiment could incorporate a cargo carrier, a cooler, a fuel holder, a bike rack, a kayak rack, or other carry container to the system for added benefits.

In another embodiment, the height of the system relative to the horizontal plane of the vehicle receiver hitch 8 could be altered.

Another embodiment could have a support frame that rotates horizontally to position the front of the cooking apparatus 13 facing the forward direction of the vehicle or the rearward direction of the vehicle. This embodiment would allow the user to orient the cooking apparatus to cook from behind the vehicle or at the side of the vehicle when swung out.

The swing away tailgate barbeque cooking system may be manufactured and provided for sale in a wide variety of sizes and shapes for a wide assortment of applications. After reading the description and illustrations, it should be understood that under appropriate circumstances, such as design preferences, user preferences, vehicle requirements, marketing preferences, cost, materials, technological advances, etc . . . , other components, elements, and customized parts may be sold or included to achieve the scope and spirit of the invention.

It is thought that advantages will be understood from the foregoing description and it will be apparent that various changes may be made thereto without departing from the spirit and scope of the invention or sacrificing its material advantage. It will be understood that no limitation of the scope and spirit of the invention is intended, with such alterations and further modifications in the illustrated device and such further applications of the principles of the invention as illustrated therein being contemplated as would normally occur to one skilled in the art to which the invention relates. Some examples of obvious modifications include: The number of connection points to the vehicle could be greater than 1 or 2; the size and shape of the mounting, connecting, and supporting bars could be different; the material composition could be different; the size or shape or number of legs could be more or less; the makeup and, configuration of the cooking apparatus used could be numerous; the position of the pivot point and where it is located could be on a different plane; multiple pivot points could be used to provide the desired extensions; the connecting bars could rotate or disconnect from the mounting bar; the support frame could be of various sizes, shapes, and configurations to mount to various cooking apparatus; a hitch receiver for flat towing could be bonded onto the mounting bar instead of extended from the vehicle center receiver hitch; the adjustable legs could be mounted to the unit at different points and in different orientations; the cooking apparatus could be lifted higher via hydraulics, electric or other means to add ground clearance; the assembly could have support members joined to the frame or bumper instead of the hitch receiver; to list a few examples of obvious modifications, but not limited to the afore mentioned modifications.

In the above embodiments, the different elements, features, positions and structures of the present invention are described separately in each of the embodiments. However, it is the full intention that the separate aspects of each embodiment described herein may be combined with the other embodiments. Those skilled in the art will appreciate that the adaptations, alternatives, modifications, and methods of the described embodiments can be configured without departing from the scope and spirit of the invention. Therefore, it is understood that the invention may be practiced other than as specifically described herein.

What is claimed:

1. A Swing Away Tailgate BBQ Cooking System that can be attached to a vehicle, for camping, tailgating, and mobile cooking applications comprising:
    a mounting bar, the mounting bar having a first straight portion and a second portion located in the same substantially horizontal plane of the first straight portion, the second portion being angled away from the vehicle;
    at least one connecting arm, the connecting arm being connected to the straight portion of the mounting bar on one end and extending perpendicularly to the mounting bar, the other end of the connecting arm being configured to be received in a vehicle hitch receiver, the hitch having multiple receivers;
    a swing away bar and a telescoping bar that telescope relative to each other and allow the length of the telescoping bar to be adjustable, the swing away bar being connected to the angled portion of the mounting bar, and the telescoping bar having inner dimensions greater than the outer dimensions of the swing away bar;
    a pivot connection between the mounting bar and the swing away bar that allows the swing away bar to move relative to the mounting bar between a traveling position where the mounting bar and swing away bar are generally parallel to each other and a use position where the swing away bar can move through approximately 180 degrees relative to the mounting bar;
    a lock for securing the telescoping bar to the mounting bar, the lock having multiple securing mechanisms;
    a support frame for supporting a cooking apparatus, the support frame being connected to the telescoping bar;
    multiple vertically adjustable legs; and multiple connections for the adjustable legs, the connections being located on the support frame, swing away bar and/or mounting bar, the connections being capable of supporting the legs in a use position where the legs contact the ground and in a traveling position where the legs are either removed or pivoted 90 degrees to be parallel with the support frame.

2. The swing away bbq cooking system of claim 1, having a center receiving hitch extension connected to the mounting bar, the receiving hitch capable of being connected for towing.

3. The swing away bbq cooking system of claim 1 wherein the second portion of the mounting bar is angled at about 45 degrees relative to the first straight portion of the mounting bar and the swing away bar is capable of being positioned at multiple positions to lengthen the distance between the cooking apparatus and the vehicle.

4. The swing away bbq cooking system of claim 1, the telescoping bar having a lip on the opposite end from the pivot point extending perpendicularly towards the vehicle.

5. The swing away bbq cooking system of claim 1, where the vehicle is a recreational vehicle, trailer or food truck.

6. The swing away bbq cooking system of claim 1, where the multiple adjustable legs can support the apparatus independently from the vehicle for stand-alone use.

7. The swing away bbq cooking system of claim 1, where the multiple adjustable legs can raise or lower the vertical height of the apparatus for connecting or disconnecting from the vehicle.

8. The swing away bbq cooking system of claim 1, where the cooking apparatus can be mounted on the support frame facing forward or rearward from the vehicle.

9. A Swing Away Tailgate BBQ Cooking System that can be attached to a vehicle, for camping, tailgating, and mobile cooking applications comprising:
- a mounting bar, a mounting bar having a first straight portion and a second portion located in the same substantially horizontal plane of the first straight portion, the second portion being angled at about 45 degrees relative to the straight portion and away from the vehicle, and the second portion of the mounting bar is connected to a swing away bar on one end at a pivot point;
- at least one connecting arm, the connecting arm being connected to the straight portion of the mounting bar on one end and extending perpendicularly to the mounting bar, the other end of the connecting arm being configured to be received in a vehicle hitch receiver, the hitch having multiple receivers;
- a pivot connection between the mounting bar and the swing away bar that allows the swing away bar to move relative to the mounting bar between a traveling position where the mounting bar and swing away bar are generally parallel to each other and a use position where the swing away bar can move through approximately 180 degrees relative to the mounting bar;
- a lock for securing the swing away bar to the mounting bar, the lock having multiple securing mechanisms including a screw bolt, and a lip extending from the swing away bar and connecting to the mounting bar with a fastener;
- a support frame for supporting a cooking apparatus, the support frame being connected to the swing away bar;
- multiple vertically adjustable legs; and
- multiple connections for the adjustable legs, the connections being located on the support frame, swing away bar and/or mounting bar, and being capable of supporting the legs in a use position where the legs contact the ground and in a traveling position are either removed or pivoted 90 degrees to be parallel with the support frame.

10. The swing away bbq cooking system of claim 9, having a center receiving hitch extension connected to the mounting bar, the receiving hitch capable of being connected for towing.

11. The swing away bbq cooking system of claim 9, where the vehicle is a recreational vehicle, trailer or food truck, where the cooking apparatus can be mounted on the support frame facing forward or rearward from the vehicle, and the pivot point is located near the outside edge of the vehicle to provide clearance when in the use position.

12. The swing away bbq cooking system of claim 9, where the multiple adjustable legs can support the apparatus independently from the vehicle for stand-alone use, the multiple adjustable legs can raise or lower the vertical height of the apparatus for connecting or disconnecting from the vehicle.

13. A Swing Away Tailgate BBQ Cooking System that can be attached to a vehicle, for camping, tailgating, and mobile cooking applications comprising:
- a mounting bar, a mounting bar having a first straight portion and a second portion located in the same substantially horizontal plane of the first straight portion, the second portion being angled at about 45 degrees relative to the straight portion and away from the vehicle connected to the swing away bar on one end at the pivot point;
- at least one connecting arm, the connecting arm being connected to the straight portion of the mounting bar on one end and extending perpendicularly to the mounting bar, the other end of the connecting arm being configured to be received in a vehicle hitch receiver, the hitch having one receiver;
- a pivot connection between the mounting bar and the swing away bar that allows the swing away bar to move relative to the mounting bar between a traveling position where the mounting bar and swing away bar are generally parallel to each other and a use position where the swing away bar can move through approximately 180 degrees relative to the mounting bar;
- a lock for securing the swing away bar to the mounting bar, the lock having multiple securing mechanisms including a screw bolt, and a lip extending from the swing away bar and connecting to the mounting bar with a fastener;
- a support frame for supporting a cooking apparatus, the support frame being connected to the swing away bar;
- multiple vertically adjustable legs; and
- multiple connections for the adjustable legs, the connections being located on the support frame, swing away bar and/or mounting bar, and being capable of supporting the legs in a use position where the legs contact the ground and in a traveling position are either removed or pivoted 90 degrees to be parallel with the support frame.

14. The swing away bbq cooking system of claim 13, having a center receiving hitch connected to the mounting bar, the receiving hitch capable of being connected for towing.

15. The swing away bbq cooking system of claim 13, wherein the lip on the swing away bar is located on the opposite end from the pivot point extending perpendicularly towards the vehicle.

16. The swing away bbq cooking system of claim 13, where the vehicle is a truck or SUV.

17. The swing away bbq cooking system of claim 13, where the multiple adjustable legs can support the apparatus independently from the vehicle for stand-alone use.

18. The swing away bbq cooking system of claim 13, where the multiple adjustable legs can raise or lower the vertical height of the apparatus for connecting or disconnecting from the vehicle.

19. The swing away bbq cooking system of claim 13, where the cooking apparatus can be mounted on the support frame facing forward or rearward from the vehicle.

20. The swing away bbq cooking system of claim 13, the pivot connection is located near the outside edge of the vehicle to provide clearance when in the use position.

* * * * *